United States Patent
Han et al.

(10) Patent No.: US 11,940,850 B2
(45) Date of Patent: Mar. 26, 2024

(54) ELECTRONIC DEVICE FOR PROVIDING FUNCTION EXECUTION SCREEN AND OPERATION METHOD THEREFOR

(71) Applicant: SAMSUNG ELECTRONICS CO., LTD., Suwon-si (KR)

(72) Inventors: Jonghyun Han, Suwon-si (KR); Younghak Oh, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 17/991,932

(22) Filed: Nov. 22, 2022

(65) Prior Publication Data

US 2023/0080358 A1    Mar. 16, 2023

Related U.S. Application Data

(63) Continuation of application No. PCT/KR2021/006274, filed on May 20, 2021.

(30) Foreign Application Priority Data

May 22, 2020  (KR) .................. 10-2020-0061862

(51) Int. Cl.
    *G06F 1/16*    (2006.01)
(52) U.S. Cl.
    CPC .......... *G06F 1/1677* (2013.01); *G06F 1/1616* (2013.01); *G06F 1/1652* (2013.01)
(58) Field of Classification Search
    CPC .... G06F 1/1677; G06F 1/1616; G06F 1/1652; G06F 1/1694; G06F 1/1692
    See application file for complete search history.

(56) References Cited

U.S. PATENT DOCUMENTS

| | | | |
|---|---|---|---|
| 8,803,816 B2 * | 8/2014 | Kilpatrick | G06F 1/1654 |
| | | | 345/173 |
| 11,210,050 B2 * | 12/2021 | Ko | G06F 1/1652 |
| (Continued) | | | |

FOREIGN PATENT DOCUMENTS

| | | |
|---|---|---|
| JP | 2018205849 A | 12/2018 |
| KR | 1020110058879 A | 6/2011 |
| (Continued) | | |

OTHER PUBLICATIONS

International Search Report and Written Opinion issued in International Application No. PCT/KR2021/006274; Application Filing Date May 20, 2021; dated Aug. 25, 2021 (20 pages).

*Primary Examiner* — Sardis F Azongha
(74) *Attorney, Agent, or Firm* — CANTOR COLBURN LLP

(57) ABSTRACT

An electronic device according to various embodiments comprises: a first housing and a second housing; a hinge for rotatably connecting the first housing and the second housing; a display exposed through a first part of the first housing and a second part of the second housing; a location sensor; at least one sensor other than the location sensor; a memory; and a processor operatively coupled to the display, the location sensor, the at least one sensor, and the memory, wherein the processor can be set to identify the location of the electronic device through the location sensor, identify a folding state of the electronic device through the at least one sensor, and perform a prestored function corresponding to the location and the folding state of the electronic device.

18 Claims, 13 Drawing Sheets

(56) References Cited

U.S. PATENT DOCUMENTS

| | | |
|---|---|---|
| 2005/0060532 A1 | 3/2005 | Dorenbosch et al. |
| 2010/0060664 A1 | 3/2010 | Kilpatrick, II et al. |
| 2013/0088442 A1 | 4/2013 | Lee |
| 2014/0101575 A1 | 4/2014 | Kwak et al. |
| 2014/0274122 A1 | 9/2014 | Tseng et al. |
| 2014/0380186 A1 | 12/2014 | Kim et al. |
| 2015/0378557 A1 | 12/2015 | Jeong et al. |
| 2017/0221456 A1 | 8/2017 | Kim et al. |
| 2018/0164851 A1 | 6/2018 | Park et al. |
| 2018/0198896 A1 | 7/2018 | Kang et al. |
| 2018/0352098 A1 | 12/2018 | Kanamaru |
| 2019/0286200 A1 | 9/2019 | Ho et al. |
| 2020/0128116 A1 | 4/2020 | Jang et al. |
| 2021/0089081 A1 | 3/2021 | Ro et al. |
| 2022/0057866 A1* | 2/2022 | Xu .................... H04M 1/72454 |

FOREIGN PATENT DOCUMENTS

| | | |
|---|---|---|
| KR | 1020130037596 A | 4/2013 |
| KR | 1020140046346 A | 4/2014 |
| KR | 1020160139643 A | 12/2016 |
| KR | 1020170006055 A | 1/2017 |
| KR | 1020170102451 A | 9/2017 |
| KR | 1020180020737 A | 2/2018 |

* cited by examiner

| Folded state | Public space | Authentication space 1/ account 1 (Home) | Authentication space 2/ account 1 (office) | Authentication 1/account 2 (Home) |
|---|---|---|---|---|
| State A | There is no separate mode execution | There is no separate mode execution | | Kids mode |
| State B | | C Cloud mode | Window or dex mode | |
| State C | | E-book mode | Note or MS word mode | Gallery or drawing mode |
| State D | | Bixby Speaker mode | VC meeting mode | Kids Youtube mode |

FIG. 5

ELECTRONIC DEVICE FOR PROVIDING FUNCTION EXECUTION SCREEN AND OPERATION METHOD THEREFOR

CROSS-REFERENCE TO RELATED APPLICATION(S)

This application is continuation of International Application No. PCT/KR2021/006274, filed on May 20, 2021, which claims priority to Korean Patent Application No. 10-2020-0061862 filed on May 22, 2020 in the Korean Intellectual Property Office, the disclosures of which are herein incorporated by reference.

BACKGROUND

Technical Field

One embodiment of the disclosure relates to an electronic device for providing a function execution screen and an operating method thereof.

Background Art

Portable digital communication devices have become essential elements for many people living in modern times. Consumers want to be provided with various high-quality services they want anytime and anywhere using portable digital communication devices.

In order to provide various high-quality services, portable digital communication devices store various types of applications. The portable digital communication devices execute an application to provide a specific service, and display graphic elements that can interact with a user and are displayed on an execution screen of the executed application.

As the state of at least one housing is changed to be folded or unfolded according to the user's control, the portable digital communication devices may be placed in various states. When the state of the at least one housing is changed according to the user's control, the regions of a display having various sizes or various horizontal and vertical ratios may be mainly chosen and used by the user. In particular, the user may use the function of the electronic device through the display region having the most suitable size and ratio by changing the state of at least one housing.

Technical Problem

A function configured by a user or frequently used may be executed by utilizing a folded state of the electronic device as a trigger based on a folded, unfolded, or rotated state of at least two housings included in an electronic device.

However, when the folded states of the electronic device suitable for a plurality of functions are the same, it is difficult to perform an appropriate function by utilizing the corresponding folded state as a trigger, and since the functions mainly used by the user are different depending on the space, when a matched function is performed whenever the electronic device is in the corresponding folded state, a function that does not conform to the user's intention may be executed, so it is inconvenient to cancel the executed function and perform a desired function again.

In addition, as the folded state can be changed, when the user normally uses the electronic device as a personal terminal and wants to use the electronic device as a public terminal (e.g., a tablet PC) in a specific place, there is a problem in that security is weakened because a plurality of users share the electronic device.

SUMMARY

An electronic device according to various embodiments may include a first housing and a second housing, a hinge configured to rotatably connect the first housing and the second housing, a display configured to be exposed through a first portion of the first housing and a second portion of the second housing, a location sensor, at least one sensor other than the location sensor, a memory, and a processor configured to be operatively connected to the display, the location sensor, the at least one sensor, and the memory, wherein the processor may be configured to identify a location of the electronic device through the location sensor, identify a folded state of the electronic device through the at least one sensor, and perform a prestored function corresponding to the location of the electronic device and the folded state of the electronic device.

A method for controlling an electronic device including a first housing and a second housing, a hinge configured to rotatably connect the first housing and the second housing, a display configured to be exposed through a first portion of the first housing and a second portion of the second housing, a location sensor, and at least one sensor other than the location sensor, may include identifying a location of the electronic device through the location sensor, identifying a folded state of the electronic device through the at least one sensor, and performing a prestored function corresponding to the location of the electronic device and the folded state of the electronic device.

According to various embodiments, an electronic device can be used for personal customization by matching a place, a folded state, and a function according to a user's setting, and a corresponding function may be performed by utilizing the folded state as a trigger only in a place authenticated by the user, thereby improving security.

According to various embodiments, by storing account information of a plurality of users, the electronic device can be used as a public device that can be customized for each of the plurality of users in an authenticated space.

According to various embodiments, when a plurality of pieces of user account information are stored, a function corresponding to a user account authenticated through user account authentication may be performed, thereby improving security even if a plurality of users share one electronic device.

BRIEF DESCRIPTION OF DRAWINGS

FIG. 5 is a diagram illustrating various embodiments of a function that can be performed through a location and a folded state of the electronic device according to one embodiment.

DETAILED DESCRIPTION OF THE INVENTION

Figure 1:
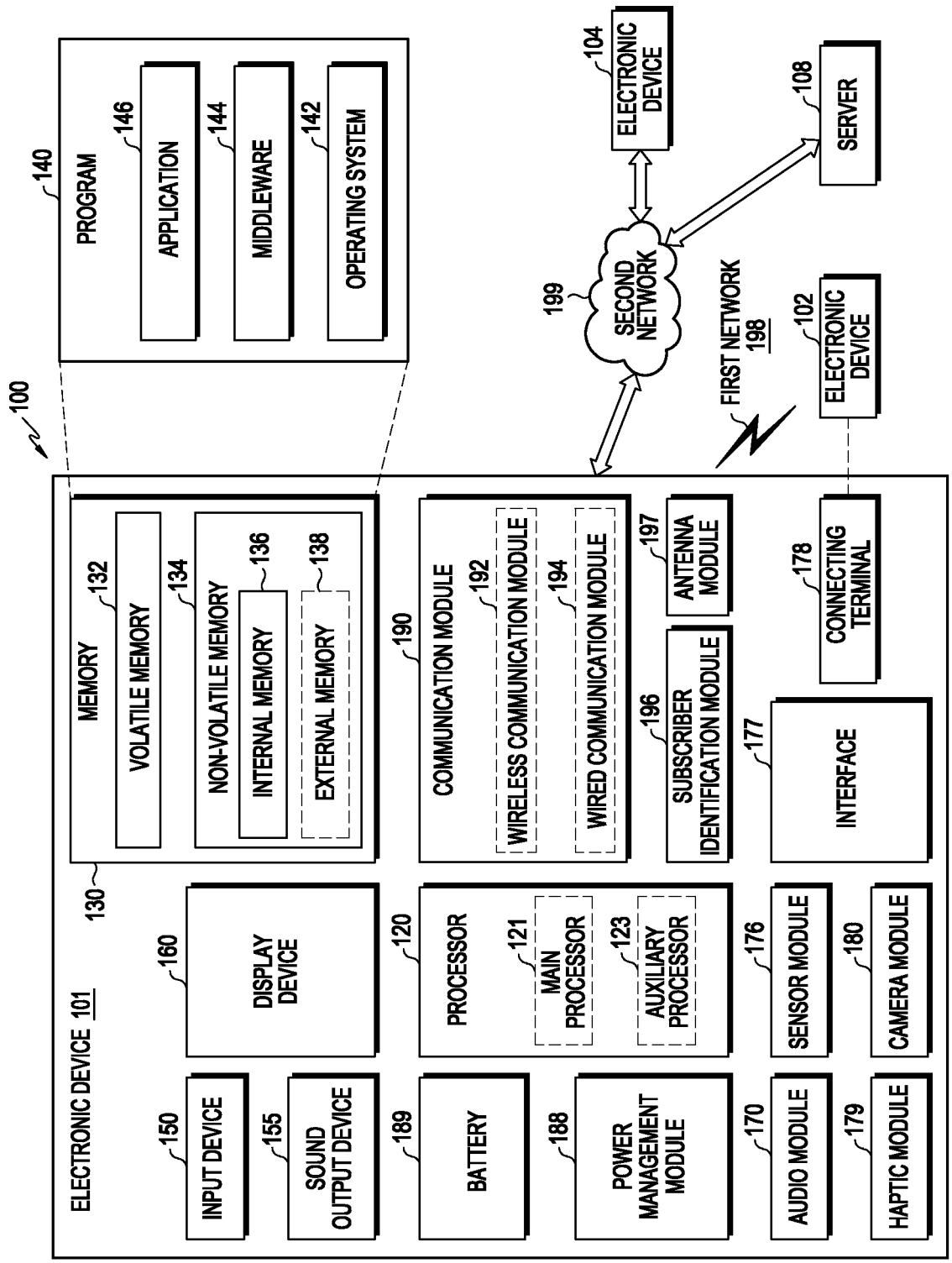
FIG. 1 is a block diagram illustrating an electronic device in a network environment according to one embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
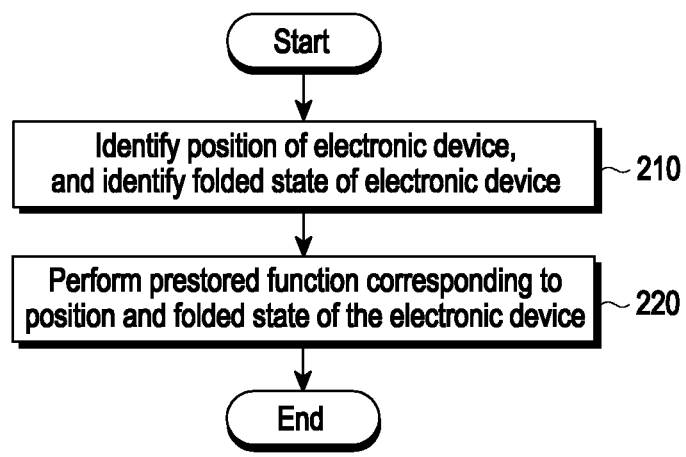
FIG. 2 is a diagram illustrating an operation of an electronic device that performs a function corresponding to a folded state of the electronic device according to one embodiment.

FIG. 2 is a diagram illustrating an operation of an electronic device that performs a function corresponding to a folded state of the electronic device according to one embodiment.

According to various embodiments, in operation 210, a processor (e.g., the processor 120) of an electronic device 101 may identify the location of the electronic device 101, and may identify a folded state of the electronic device 101.

For example, the processor (e.g., the processor 120) of the electronic device 101 may identify the folded state of the electronic device when the location of the electronic device 101 is within a prestored first area. For example, the first area may correspond to a location previously designated as a place where the electronic device 101 is mainly used, or an area previously designated by a user.

According to another embodiment, the processor (e.g., the processor 120) of the electronic device 101 may identify whether the location of the electronic device 101 is within the prestored first area when the folded state of the electronic device 101 is a prestored first folded state.

According to various embodiments, the processor (e.g., the processor 120) of the electronic device 101 may acquire the location of the electronic device through a sensing value obtained by a location sensor (e.g., the sensor module 176). For example, the location sensor may include a GPS sensor. Alternatively, the electronic device 101 may identify the location of the electronic device 101 based on various locationing methods such as a Wi-Fi based locationing system (WPS).

For example, the processor of the electronic device may acquire location information of the electronic device through information (or information in a communication signal) indicating whether communication is connected with a peripheral device (e.g., a Wi-Fi device) disposed in a prestored place, and may identify whether the location of the electronic device is within the prestored first area. For example, the location of the electronic device may be determined through the GPS sensor, and whether communication with a peripheral device (e.g., a door lock, a smart TV, a robot vacuum cleaner, a smart speaker, a multifunction device, etc.) disposed in the first area is connected may be identified to determine whether the electronic device is located within the boundary of the first area. Alternatively, the electronic device 101 may identify the location of the electronic device 101 based on an indoor locationing method (e.g., a geomagnetic locationing method). It will be understood by those skilled in the art that there is no limitation on the locationing method of the electronic device 101.

Figure 3:
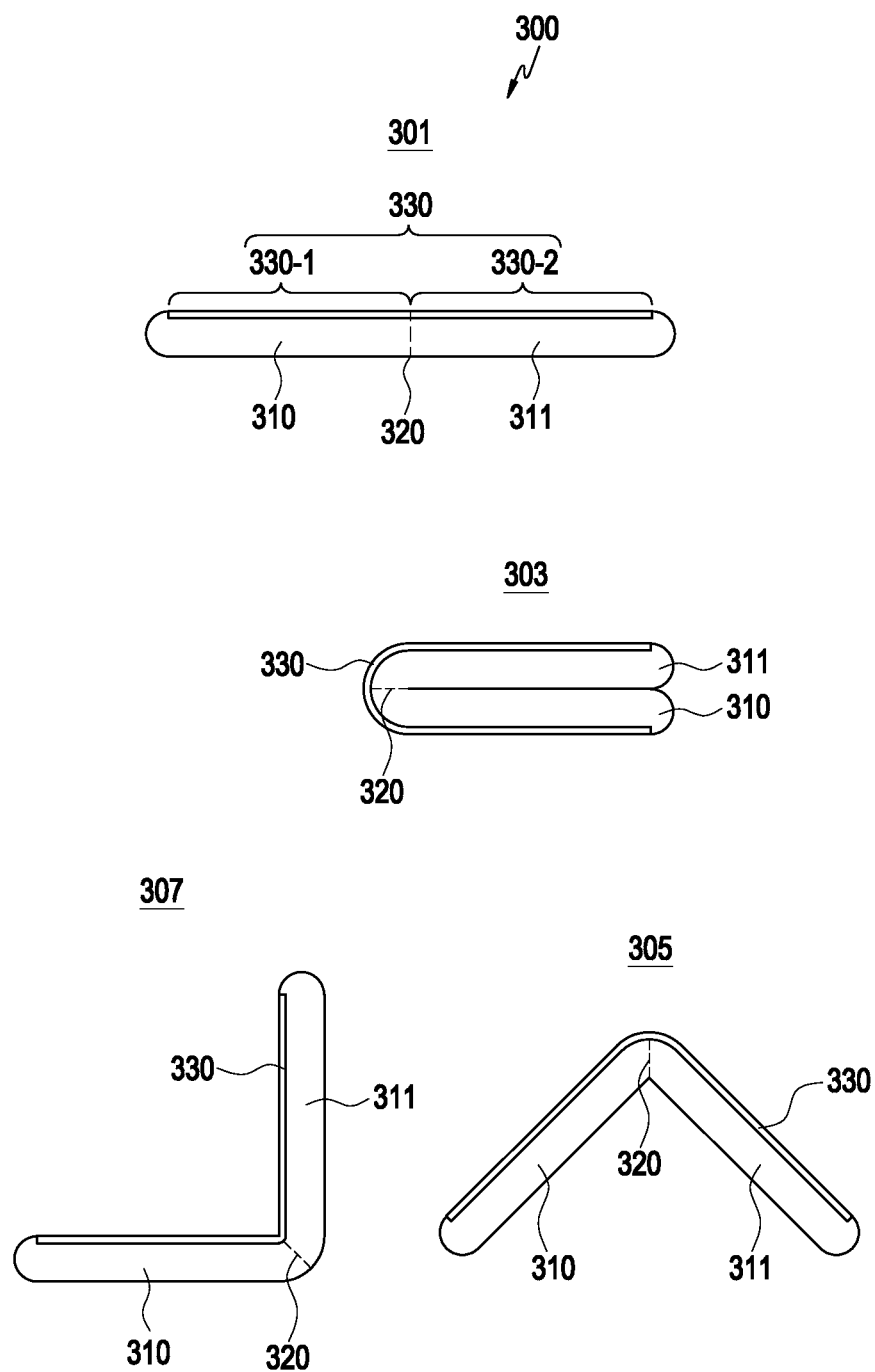
FIG. 3 is a diagram illustrating various embodiments of a folded state of an electronic device when the electronic device includes a two-sided foldable display.
Figure 4:
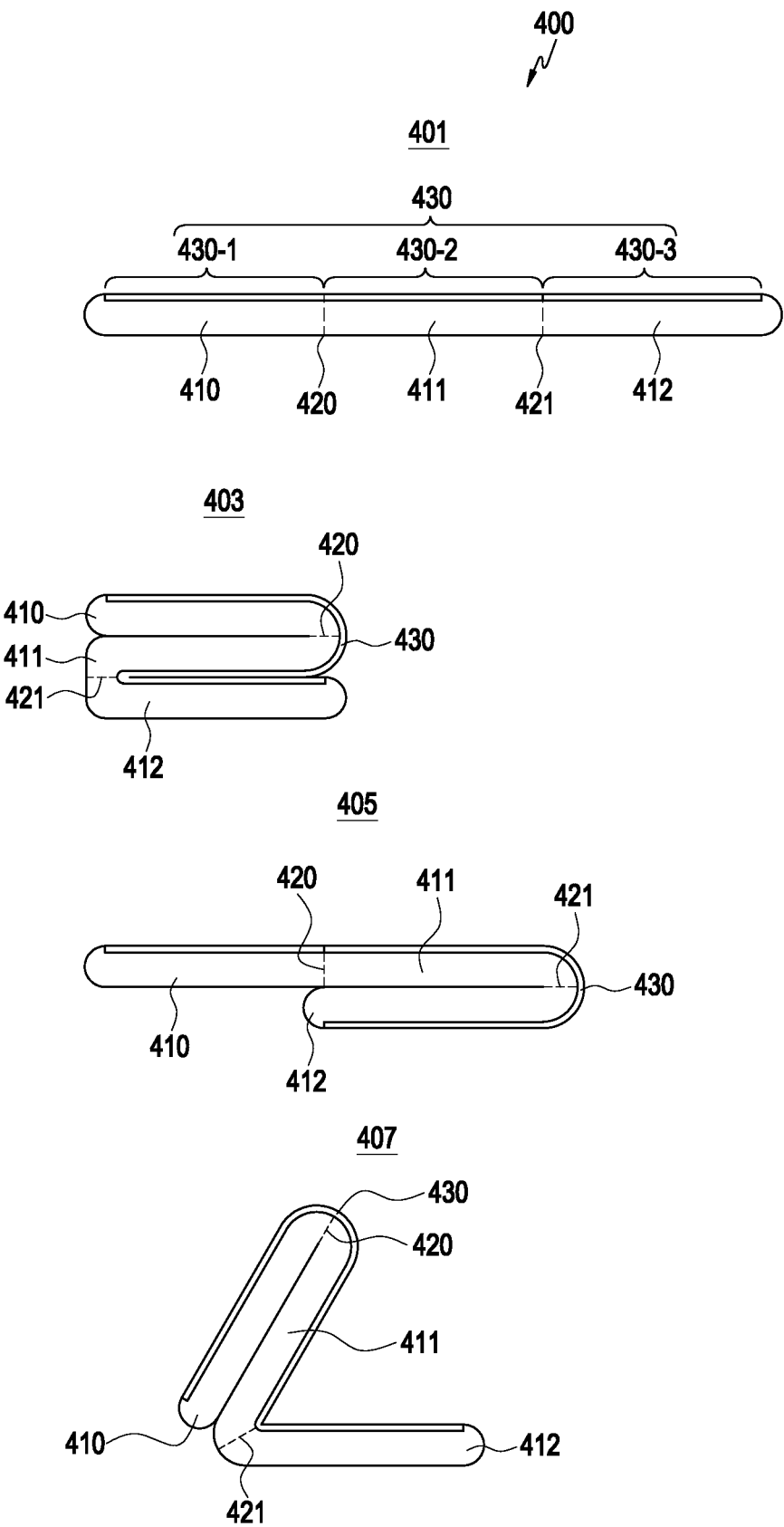
FIG. 4 is a diagram illustrating various embodiments of a folded state of an electronic device when the electronic device includes a three-sided foldable display.

According to various embodiments, the electronic device 101 may include a flexible display (e.g., a display 330 of FIG. 3 or a display 430 of FIG. 4) of two or more housing structures (a first housing 310 and a second housing 311 of FIG. 3 or a first housing 410, a second housing 411, and a third housing 412 of FIG. 4) which are rotatably connected with each other, and a plurality of folded states may be defined according to at least one of information indicating whether at least one housing is folded (e.g., at least one housing is fully folded or fully unfolded), the rotation state of at least one housing, an angle between the housings with respect to the hinge (e.g., an angle between a first portion of the first housing 310 and a second portion of the second housing 311 with respect to a hinge 320 of FIG. 3, an angle between a first portion of the first housing 410 and a second portion of the second housing 411 with respect to a first hinge 420 of FIG. 4, or an angle between the second portion of the second housing 411 and a third portion of the third housing 412), an orientation of the electronic device 101 (e.g., a direction in which the electronic device is placed with respect to the ground), a degree of inclination of the electronic device 101, or an activated portion of the flexible display (e.g., the display 330 of FIG. 3 or the display 430 of FIG. 4).

For example, various folded states of the electronic device 101 may include a half-fold form of forming two regions in an electronic device (e.g., the display 330 of FIG. 3) as shown in FIG. 3, or a form (e.g., tri-fold, Z-fold, or single open gate-fold) of forming three regions in an electronic device (e.g., the display 430 of FIG. 4) as shown in FIG. 4, but are not limited thereto. The various folded states of the electronic device 101 may include a form (e.g., double parallel reverse fold, double parallel fold, double gate fold, roll fold, accordion fold, or half-fold then half-fold) of forming four regions in an electronic device (e.g., a display {not shown}), and a form (e.g., half-fold then tri-fold) of forming a larger number of regions in an electronic device (e.g., display {not shown}).

According to various embodiments, when the electronic device 101 includes the flexible display 330 capable of forming two regions, as shown in a drawing 300 of FIG. 3 illustrating the unfolded state of the electronic device 101, the electronic device 101 may include the first housing 310, the second housing 311, the hinge 320, and the display 330.

According to various embodiments, the first housing 310 and the second housing 311 may be connected to each other. According to various embodiments, the first housing 310 and the second housing 311 may be connected by the hinge 320, and the first housing 310 and the second housing 311 may be pivotably or rotatably connected with respect to (about) the hinge 320.

According to various embodiments, the display 330 may be exposed to the outside through the first portion of the first housing 310 and the second portion of the second housing 311. For example, the display 330 may be disposed on the first housing 310 and the second housing 311 across the hinge 320. According to various embodiments, the display 330 may include a first portion 330-1 of the display disposed on the first portion of the first housing 310 and a second portion 330-2 of the display disposed on the second portion of the second housing 311.

According to various embodiments, the display 330 may be a flexible display. For example, the display 330 may be folded or unfolded as the first housing 310 or the second housing 311 is rotated about the hinge 320. Hereinafter, examples in which the display 330 is folded or unfolded will be described, but the disclosure is not limited thereto. For example, the display 330 may be implemented in a bent (bending) form, and examples in which the display 330 is implemented in a bent form may be applied in the same manner as or in a similar to examples of the case where the display 330 is folded or unfolded.

According to one embodiment, a drawing 301 may represent a state in which the electronic device 101 is fully unfolded, for example, a state in which the second housing 311 is unfolded with respect to the first housing 310. In one embodiment, when the electronic device 101 is fully unfolded, a direction in which the first portion of the first housing 310 faces and a direction in which the second portion of the second housing 311 faces may be the same. When the electronic device 101 is fully unfolded, all of the front surfaces 330-1 and 330-2 of the display 330 may be exposed to the outside.

According to various embodiments, in a state in which the electronic device 101 is fully unfolded, the processor (e.g., the processor 120) of the electronic device 101 may display an execution screen of the function of the electronic device 101 through the first portion 330-1 of the display 330 and the second portion 330-2 of the display 330.

According to one embodiment, a drawing 303 may represent a state in which the electronic device 101 is fully outfolded so that the first housing 310 and the second housing 311 face each other with respect to the hinge 320. In one embodiment, in the state in which the electronic device 101 is fully outfolded, a direction in which the first portion of the first housing 310 faces and a direction in which the second portion of the second housing 311 faces may be opposite each other. According to various embodiments, in the state in which the electronic device 101 is fully outfolded, the first housing 310 and the second housing 311 may face each other, and the first portion 330-1 and the second portion 330-2 of the display 330 may be exposed to face opposite direction from each other.

According to various embodiments, in the state in which the electronic device 101 is fully outfolded, a portion to be activated from the first portion 330-1 and the second portion 330-2 of the display 330 and information (e.g., an execution screen of the function of the electronic device 101) to be displayed on the activated portion may be determined based on a direction where the electronic device 101 is placed and an inclination value of the electronic device 101. For example, the execution screen of the function of the electronic device 101 may be displayed on at least one of the activated first portion 330-1 or second portion 330-2 of the display 330 based on the direction in which the electronic device 101 is placed and the inclination value of the electronic device 101.

According to one embodiment, a drawing 305 may represent a state in which the electronic device 101 is semi-outfolded with respect to the hinge 320 so that the first portion of the first housing 310 and the second portion of the second housing 311 have an obtuse angle therebetween.

According to various embodiments, in the state in which the electronic device 101 is semi-outfolded so that the first portion of the first housing 310 and the second portion of the second housing 311 have an obtuse angle therebetween, a portion to be activated from the first portion 330-1 and the second portion 330-2 of the display 330 and information (e.g., an execution screen of the function of the electronic device 101) to be displayed on the activated portion may be determined based on a direction in which the electronic device 101 is placed and an inclination value of the electronic device 101.

According to various embodiments, when the electronic device 101 is fully outfolded, the portion to be activated from the first portion 330-1 and the second portion 330-2 of the display 330 and information (e.g., the execution screen of the function of the electronic device 101) to be displayed on the activated portion may be determined based on the direction in which the electronic device 101 is placed and the inclination value of the electronic device 101.

According to one embodiment, a drawing 307 may represent a state in which the electronic device 101 is semi-infolded with respect to the hinge 320 so that the first portion of the first housing 310 and the second portion of the second housing 311 have an acute angle therebetween.

According to various embodiments, in the state in which the electronic device 101 is semi-infolded so that the first portion of the first housing 310 and the second portion of the second housing 311 have an acute angle therebetween, a portion to be activated from the first portion 330-1 and the second portion 330-2 of the display 330 and information (e.g., the execution screen of the function of the electronic device 101) to be displayed on the activated portion may be determined based on a direction in which the electronic device 101 is placed and an inclination value of the electronic device 101.

In FIG. 3, it is illustrated that the electronic device 101 is folded as the first portion 330-1 and second portion 330-2 of the display arranged on the left and right sides with respect to the hinge 320 arranged in the vertical direction in the electronic device 101 are rotated, respectively, but according to various embodiments, the electronic device 101 may be implemented to be folded as the hinge is arranged in the horizontal direction in the electronic device 101 and the first portion 330-1 and the second portion 330-2 of the display arranged above or below the hinge are rotated, respectively.

According to various embodiments, when the electronic device 101 includes the flexible display 430 capable of forming three regions, as shown in reference numeral 400 illustrated in FIG. 4 describing the folded state of the electronic device 101, the electronic device 101 may include the first housing 410, the second housing 411, the third housing 412, the first hinge 420, the second hinge 421, and the display 430.

According to various embodiments, the first housing 410, the second housing 411, and the third housing 412 may be connected to one another. One side surface of the first housing 410 and one side surface of the second housing 411 are connected to each other, and one side surface of the second housing 411 and one side surface of the third housing 412 may be connected to each other. According to various embodiments, the first housing 410 and the second housing 411 may be connected by the first hinge 420 and may be pivotably or rotatably connected to each other with respect to (relative to) the first hinge 420. According to various embodiments, the second housing 411 and the third housing 412 may be connected by the second hinge 421 and may be pivotably or rotatably connected to each other with respect to the second hinge 421.

According to various embodiments, the display 430 may be exposed to the outside through the first portion of the first housing 410, the second portion of the second housing 411, and the third portion of the third housing 412. For example, the display 430 may be arranged on the first housing 410, the second housing 411, and the third housing 412 across the hinge 420. According to various embodiments, the display 430 may include a first portion 430-1 of the display arranged on the first portion of the first housing 410, a second portion 430-2 of the display arranged on the second portion of the second housing 411, and a third portion 430-3 of the display arranged on the third portion of the third housing 412.

According to various embodiments, the display 430 may be a flexible display. For example, the display 430 may be folded or unfolded as the first housing 410 or the second housing 411 are rotated with respect to the first hinge 420, or the second housing 411 or the third housing 412 are rotated with respect to the second hinge 421. Hereinafter, examples are described in which the display 430 is folded or unfolded, but the disclosure is not limited thereto. For example, the display 430 may be implemented in a bent (or bending) form, and examples in which the display 430 is implemented in a bent form may be applied in the same manner as or in a similar manner to examples of the case where the display 430 is folded or unfolded.

According to various embodiments, a drawing 401 may represent a state in which the electronic device 101 is fully unfolded, for example, a state in which the first housing 410 and the third housing 412 are unfolded with respect to the second housing 411. According to various embodiments, in the state in which the electronic device 101 is fully unfolded, a direction in which the first portion of the first housing 410 faces, a direction in which the second portion of the second housing 411 faces, and a direction in which the third portion of the third housing 412 faces may be the same. According to various embodiments, in the state in which the electronic device 101 is fully unfolded, the display 430 may be exposed to the outside. For example, in the state in which the electronic device 101 is fully unfolded, all of the front surfaces 430-1, 430-2, and 430-3 of the display 430 may be exposed to the outside.

According to various embodiments, in the state in which the electronic device 101 is fully unfolded, the processor (e.g., the processor 120) of the electronic device 101 may display the execution screen of the function of the electronic device 101 through the first portion 430-1, the second portion 430-2, and the third portion 430-3 of the display 430.

According to one embodiment, a drawing 403 may represent a state in which the electronic device 101 is fully folded. In the state in which the electronic device 101 is fully folded, the direction in which the first portion of the first housing 410 faces and the direction in which the third portion of the third housing 412 faces are the same, and the direction in which the second portion of the second housing 411 faces may be opposite a direction in which the first housing 410 and the third housing 412 face. In the state in which the electronic device 101 is fully folded, the second portion of the second housing 411 may face the first portion of the first housing 410 and the third portion of the third housing 412, only the first portion 430-1 of the display may be exposed to the outside, and the second portion 430-2 and the third portion 430-3 of the display may not be exposed to the outside. According to various embodiments, when the folded directions are different, in the fully folded state, only the third portion 430-3 of the display may be exposed to the outside and the first portion 430-1 and second portion 430-2 of the display may not be exposed to the outside.

In one embodiment, a drawing 405 may represent a state in which the first housing 410 is unfolded with respect to the second housing 411 and only the third housing 413 is partially fully folded with respect to the second housing 411. According to various embodiments, in the partially fully folded state, the direction in which the first portion of the first housing 410 faces and the direction in which the second portion of the second housing 411 faces are the same, and the direction in which the second portion of the second housing 411 faces may be opposite the direction in which the third portion of the third housing 412 faces. According to various embodiments, in the state in which the electronic device 101 is partially fully folded, the second housing 411 and the third housing 412 may face each other, the first portion 430-1 and the second portion 430-2 of the display 430 may be exposed in the same direction, and the third portion 430-3 of the display may be exposed to face the second portion 430-2.

According to various embodiments, in the state in which the electronic device 101 is partially fully folded, the processor (e.g., the processor 120) of the electronic device 101 may determine a portion to be activated and information (e.g., the execution screen of the function of the electronic device 101) to be displayed on the activated portion based on a direction in which the electronic device 101 is placed and an inclination value of the electronic device 101. For example, the processor (e.g., the processor 120) of the electronic device 101 may display the execution screen of the function of the electronic device 101 through the first portion 430-1 and second portion 430-2 of the display 430 based on the direction in which the electronic device 101 is placed and the inclination value of the electronic device 101, or may display the execution screen of the function of the electronic device 101 through the third portion 430-3 of the display.

According to various embodiments, the second housing 411 and the third housing 412 may be unfolded and the first housing 410 may be fully folded, and as shown in the drawing 405, the electronic device is illustrated as being outfolded, but may be implemented to be infolded. For example, when the first housing 410 and the second housing 411 are infolded with respect to the first hinge 420 and the second housing 411 and the third housing 412 are unfolded, only the third portion 430-3 of the display may be exposed to the outside.

In one embodiment, a drawing 407 may represent a state in which the first housing 410 and the second housing 411 are fully folded and the second housing 411 and the third housing 412 have a constant angle therebetween in a standing state. According to various embodiments, the third housing 412 may be in contact with the ground to serve as a support, and the processor (e.g., the processor 120) of the electronic device 101 may activate the first portion 430-1 of the display 430, and may determine information to be displayed on the activated first portion 430-1 of the display 430.

In FIG. 4, it is illustrated that the electronic device 101 is folded as the first portion 430-1, the second portion 430-2, and the third portion 430-3 of the display arranged on the left and right sides with respect to the first hinge 420 and second hinge 421 arranged in the electronic device 101 in the vertical direction are rotated, respectively, but according to various embodiments, the electronic device 101 may be implemented to be folded in such a manner that the first hinge 420 and the second hinge 421 are arranged in the horizontal direction in the electronic device 101, respectively, and the first portion 430-1, the second portion 430-2, and the third portion 430-3 of the display arranged above or below the first hinge 420 and the second hinge 421 are rotated, respectively.

The folded states shown in FIGS. 3 and 4 are only examples, but are not limited thereto, and various folded states are possible based on at least one of an unfolded state, an infolded state, an outfolded state, an angle between the housings, a direction in which the electronic device is placed, or an inclination of the electronic device.

Although not illustrated in FIGS. 3 and 4, in one embodiment, the electronic device 101 may include at least one sensor for detecting the folded state. According to various embodiments, the at least one sensor may include at least one of a hall sensor, a proximity sensor, an angle sensor, a load cell, an infrared sensor, a pressure sensor, an acceleration sensor, a gyro sensor, and an electromagnetic sensor. However, the at least one sensor for detecting the folded state of the electronic device 101 are not limited to the above-described examples.

According to various embodiments, when there is a prestored function corresponding to an authenticated space in which the electronic device 101 is located and the folded state, the processor (e.g., the processor 120) of the electronic device 101 may perform the prestored function.

For example, in operation 220, the processor (e.g., the processor 120) of the electronic device 101 may perform a prestored function corresponding to the location of the electronic device 101 and the folded state of the electronic device 101. For example, when the location of the electronic device 101 is within a prestored first area, the processor (e.g., the processor 120) of the electronic device 101 may perform a function corresponding to the location and folded state of the electronic device 101 in such a manner that the folded state can be activated as a trigger for performing the function. As another embodiment, when the folded state of the electronic device 101 is a prestored first folded state, the processor (e.g., the processor 120) of the electronic device 101 may identify the location of the electronic device 101, and may perform the function corresponding to the location and folded state of the electronic device 101 in such a manner that the location of the electronic device 101 can be activated as a trigger for performing the function.

Figure 10:
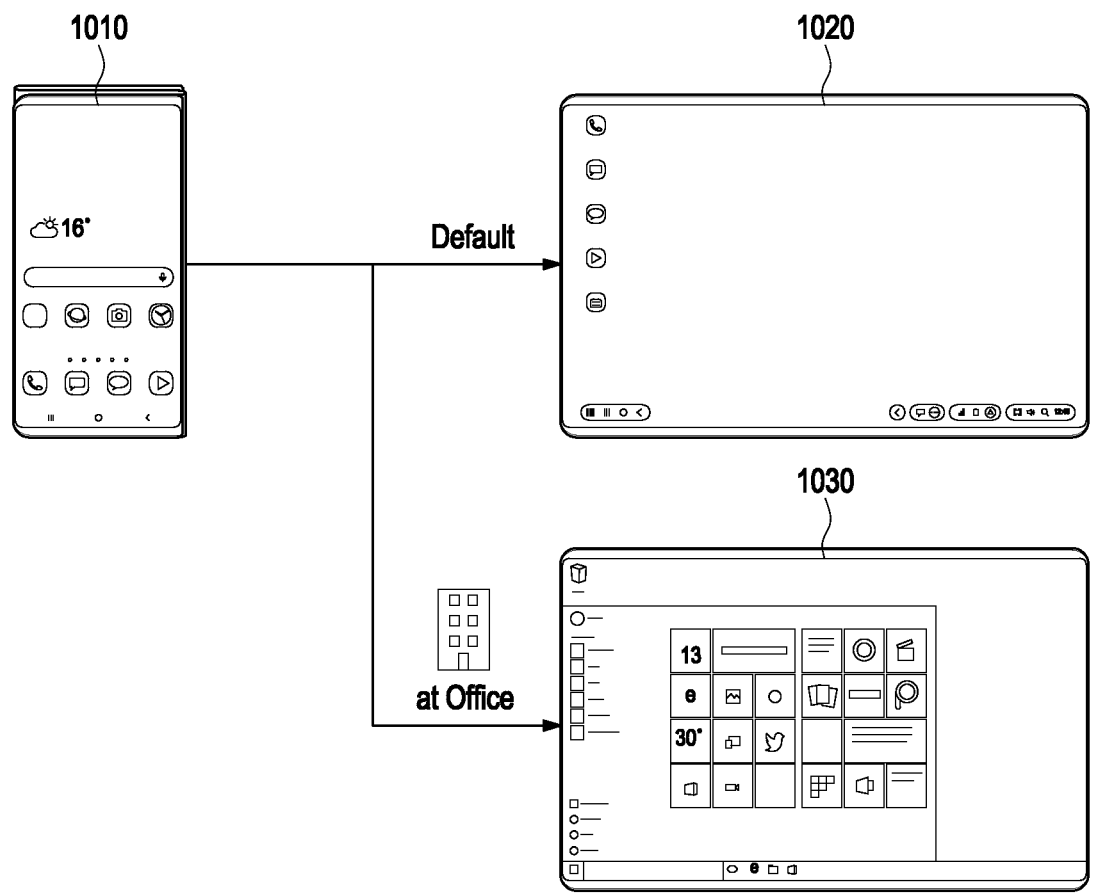
FIG. 10 is a diagram illustrating an operation of an electronic device according to a change in a folded state of the electronic device in a prestored location according to one embodiment.

For example, as shown in FIG. 10, when the electronic device 101 is in a fully folded state, the processor (e.g., the processor 120) of the electronic device may display a smartphone screen 1010 (e.g., a menu screen or a launcher application execution screen) of an operating system (e.g., Android™) stored at the time of manufacture of the electronic device 101.

According to various embodiments, when the location of the electronic device 101 is outside the prestored first area (default) and the electronic device 101 is fully unfolded, the processor (e.g., the processor 120) of the electronic device may display a tablet PC screen 1020 of the operating system (e.g., Android™) stored at the time of manufacture of the electronic device 101. For example, as to the tablet PC screen 1020, icons or information (e.g., date information, time information, weather information, etc.) of at least one application displayed on the smartphone screen 1010 may be arranged to conform to the size of the activated portion of the display (e.g., the display device 160). For example, as to the tablet PC screen 1020, the icons of the at least one application displayed on the smartphone screen 1010 may be sequentially arranged from the upper left of the display (e.g., the display device 160), and the weather information may be arranged at the lower right of the display (e.g., the display device 160).

According to various embodiments, a plurality of screen arrangements corresponding to the sizes of the activated portions of the plurality of displays (e.g., the display device 160) may be prestored.

According to various embodiments, when the location of the electronic device 101 is within a prestored first area (e.g., office) and the electronic device 101 is fully unfolded, the processor (e.g., the processor 120) of the electronic device may display a screen 1030 on which a prestored function is performed by matching the first area and the state in which the electronic device is fully unfolded.

For example, the screen 1030 on which the prestored function is performed may be displayed by changing the shape of the icons of the plurality of applications, which are objects displayed on the screen, to a block shape, or may be a screen in which the electronic device 101 is switched (e.g., booted) to an operating system (e.g., Windows™) different from the currently used operating system (e.g., Android™) in a state in which the electronic device 101 is fully folded. For example, a function of displaying the screen in which the icons of the plurality of applications are changed to a block form or a function of switching to another operating system (e.g., Windows™) may be stored by matching the first area and the state of the fully unfolded electronic device 101 by the user's setting. According to various embodiments, the first area and the state of the fully unfolded electronic device 101 may match a function in which a specific application of another operating system is performed, by the user's setting, or may match a function in which a specific application of the same operating system is performed, or may match a specific function (e.g., an artificial intelligence speaker function) of the electronic device 101 to be activated.

According to various embodiments, as shown in FIG. 5, functions corresponding to the location and folded state of the electronic device 101 may be matched and stored in the electronic device 101.

Referring to FIG. 5, when the electronic device 101 is located in a public space other than a space in which the electronic device 101 is authenticated, the electronic device 101 may perform a function based on an operation command input by the user regardless of the folded state. According to various embodiments, as to the authenticated space, an area designated in advance by the user or an area where the electronic device is frequently used or located for a predetermined time based on the usage history of the electronic device may be registered as the authenticated space automatically or according to user authentication. For example, the authenticated space may be user's home or office designated by the user, an area that is recognized as the user's home or office among the areas frequently used by the electronic device, or an area authenticated as user's home or office by the user among the frequently used areas. According to various embodiments, the authenticated space may be named by the user.

According to various embodiments, when a second user account corresponding to the authenticated space and the folded state is stored, the processor (e.g., the processor 120) of the electronic device 101 may perform a function prestored in an authenticated user account through user account authentication. For example, the second user account may be a second account of the main user of the electronic device 101 or an account of another user other than the main user. This will be described below with reference to FIGS. 8 and 9.

According to various embodiments, the processor (e.g., the processor 120) of the electronic device 101 may perform a prestored function corresponding to the location and folded state of the electronic device 101.

For example, when it is identified that the electronic device 101 is located in the authenticated space, the processor (e.g., the processor 120) of the electronic device 101 may identify the folded state of the electronic device 101, and when there is a prestored function corresponding to a space in which the electronic device 101 is located or the folded state, the electronic device 101 may perform the prestored function.

According to another embodiment, when it is identified that the folded state of the electronic device 101 is a prestored folded state, the processor (e.g., the processor 120) of the electronic device 101 may determine whether the location of the electronic device 101 is within an authenticated space, and when there is the prestored function corresponding to the space where the electronic device 101 is located and the folded state, the electronic device 101 may perform the prestored function.

According to various embodiments, the prestored function may include executing a specific application, changing the shape or size of an object displayed on the screen, or switching to another operating system in which a plurality of applications are installed. For example, a function corresponding to a state B in which the electronic device 101 is fully unfolded at a home that is an authenticated space may be execution of a game application (e.g., X Cloud™). For example, an application executed based on the location and folded state of the electronic device 101 may be one of a plurality of applications installed in the operating system when the electronic device 101 is in a fully folded state A.

As another embodiment, a function corresponding to the state B in which the electronic device 101 is fully unfolded at an office that is an authenticated space may be changing the icon of the application to a block form or switching (or booting) to another operating system (e.g., Windows™). In this case, the other operating system may be different from the operating system (e.g., Android™) when the electronic device 101 is in the fully folded state A, and a plurality of applications may be installed therein.

According to various embodiments, a function corresponding to a state C in which the electronic device 101 is partially fully folded at a home that is an authenticated space may be execution of an E-book application.

As another embodiment, a function corresponding to the state C in which the electronic device 101 is partially fully folded at an office that is an authenticated space may be execution of a document editing application (e.g., memo application {e.g., note} or MS Word™ application).

According to various embodiments, the prestored function may include activation of a specific function (e.g., artificial intelligence speaker function) of the electronic device 101.

For example, a function corresponding to a state D in which the electronic device 101 is in a standing state at a home that is an authenticated space may be activation of an artificial intelligence speaker (e.g., Bixby™) function.

As another embodiment, a function corresponding to the state D in which the electronic device 101 is in the standing state at an office that is an authenticated space may be execution of a video conference application.

According to various embodiments, when the folded state of the electronic device 101 is changed within the same authenticated space, the processor (e.g., the processor 120) of the electronic device 101 may change the current function to a function corresponding to the changed folded state.

For example, in a case in which the folded state of the electronic device 101 is the state C at a home that is an authenticated space, when the folded state of the electronic device 101 is changed to the state D while the E-book application that is the corresponding function is being executed, the processor (e.g., the processor 120) of the electronic device 101 may activate the artificial intelligence speaker function.

As another embodiment, when the location of the electronic device 101 is moved to another authenticated space while the folded state of the electronic device 101 is maintained, the processor (e.g., the processor 120) of the electronic device 101 may change the current function to a function corresponding to the other authenticated space.

For example, in a case in which the folded state of the electronic device 101 is the state C at a home that is the authenticated space, when the location of the electronic device 101 is changed to an office that is another authenticated space while the E-book application that is the corresponding function is being executed, the processor (e.g., the processor 120) of the electronic device 101 may execute a document editing application.

For example, when the location of the electronic device 101 is moved from the home that is the authenticated space to the office that is the other authenticated space, a space which is not authenticated between the home and the office may be included. When the folded state of the electronic device 101 is maintained as the state C and the location of the electronic device 101 is changed to a public space that is not authenticated outside the home that is the authenticated space, the processor (e.g., the processor 120) of the electronic device 101 may maintain the execution of the E-book application being executed or may perform a corresponding function based on an operation command input by the user regardless of the folded state. Next, when the folded state is maintained as the state C and the location of the electronic device 101 is changed from the public space which is not authenticated to the home that is the authenticated space, the processor (e.g., the processor 120) of the electronic device 101 may execute the document editing application.

According to various embodiments, the processor (e.g., the processor 120) of the electronic device 101 may perform a corresponding function by further considering user account information as well as the location and folded state of the electronic device 101.

For example, when account 2 (e.g., child's account) different from account 1 that is the main user's account is stored in the authenticated space and the folded state of the electronic device 101, another function may be performed according to the authenticated user account.

For example, in the home that is the authenticated space, when the folded state of the electronic device 101 is changed to a folded state matching account 2 while the electronic device 101 is performing a function corresponding to account 1, or a UI for changing user account provided on the screen is selected, the processor (e.g., the processor 120) of the electronic device 101 may display a user account authentication screen, and when account 2 is authenticated, a kids mode application different from account 1 may be executed.

According to various embodiments, in the home that is the authenticated space, a function corresponding to the state A in which account 2 is authenticated and the electronic device 101 is fully folded or the state B in which the electronic device 101 is fully unfolded may be execution of the kids mode application.

According to another embodiment, in the home that is the authenticated space, a function corresponding to the state C in which account 2 is authenticated and the electronic device 101 is partially fully folded may be execution of a gallery or drawing function (e.g., Gallery or drawing mode) of the kids mode application.

As another embodiment, in the home that is the authenticated space, a function corresponding to the state D in which account 2 is authenticated and the electronic device 101 is in a standing state may be video playback (e.g., Youtube™) of the kids mode application.

Meanwhile, the space in which the electronic device 101 is located, the folded state, the activated region of the display, the user account, and the prestored function which are described above are merely one embodiment and are not limited thereto.

Figure 6:
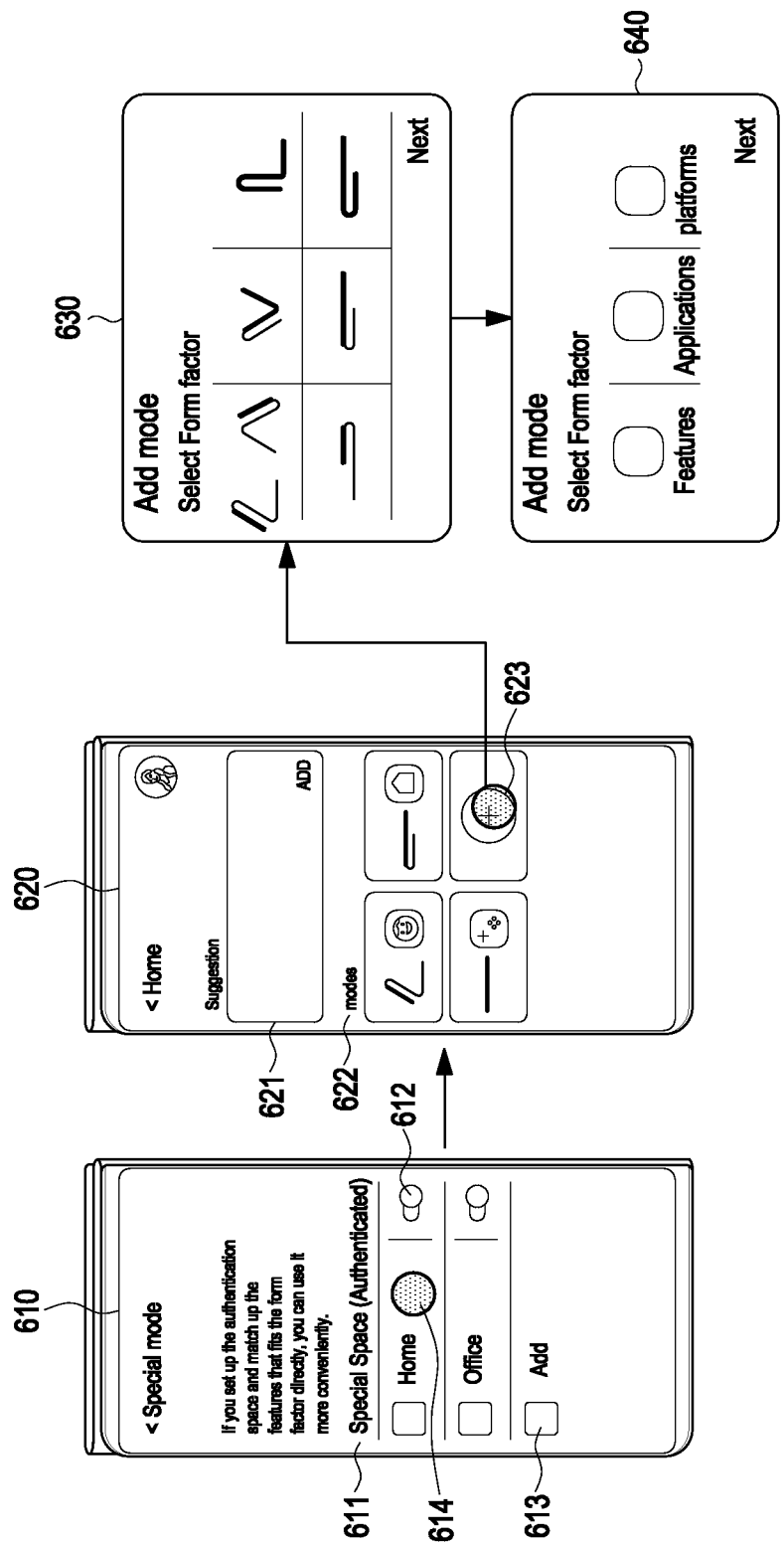
FIG. 6 is a diagram illustrating a user interface screen for matching a function with a location and a folded state of an electronic device according to one embodiment.

According to various embodiments, a prestored function corresponding to the space in which the electronic device 101 is located and the folded state may be configured in advance by the user through a user interface screen as shown in FIG. 6.

According to various embodiments, referring to FIG. 6, the processor (e.g., the processor 120) of the electronic device 101 may display a screen 610 for configuring a function corresponding to an authenticated space and a folded state based on an input of an operation command of the user. According to various embodiments, the screen 610 for configuring the function corresponding to the authenticated space and the folded state may include a region 611 for setting the authenticated space. The region 611 for setting the authenticated space may include a list of the authenticated spaces, a user interface 612 for selecting whether to activate a prestored authenticated space, and a user interface 613 for adding an additional authenticated space.

According to various embodiments, when one of the spaces authenticated by the user is selected in 614, the processor (e.g., the processor 120) of the electronic device 101 may display the user interface screen 620 associated with the selected authenticated space. According to various embodiments, the processor (e.g., the processor 120) of the electronic device 101 may include a user interface 621 for matching and suggesting the folded state and function frequently used by the user in the authenticated space on the user interface screen 620 associated with the selected authenticated space.

According to various embodiments, the processor (e.g., the processor 120) of the electronic device 101 may match and display a function that can be used by the user in the authenticated space and a folded state for function execution on the user interface screen 620 associated with the selected authenticated space in 622. For example, the processor (e.g., the processor 120) of the electronic device 101 may match the function and the folded state to display the function and the folded state in a list form.

According to various embodiments, the processor (e.g., the processor 120) of the electronic device 101 may include a user interface 623 for adding a function that can be performed based on the folded state of the electronic device 101 in the selected authenticated space on the user interface screen 620 associated with the selected authenticated space.

According to various embodiments, when the user interface 623 for adding the function is selected, the processor (e.g., the processor 120) of the electronic device 101 may display a user interface screen 630 for selecting a folded state (form factor) and a user interface screen 640 for selecting a function to match the selected folded state.

According to various embodiments, the user interface screen 630 for selecting the folded state may display a plurality of folded states that can be implemented by the electronic device 101 and one of the plurality of folded states may be selected by the user. According to another embodiment, the user interface screen 630 for selecting the folded state may further include a user interface for storing the current folded state of the electronic device 101 as an implementable folded state or a user interface for selecting a folded state for performing a function. Although not shown, a user interface for inputting information on a user account may be further included, which allows a plurality of users to use the corresponding user interface in an authenticated place.

According to various embodiments, although the electronic device 101 is illustrated as having two hinges in FIG. 6, the disclosure is of course also applicable to a case in which one hinge is provided.

According to various embodiments, although it has been illustrated and described that the respective user interface screens are sequentially displayed in FIG. 6, the order of the user interface screens is changed, or two or more user interface screens may be displayed on one screen.

As described above, an electronic device can be used for personal customization by matching the place, the folded state, and the function according to the user's setting, and a corresponding function may be performed by utilizing the folded state as a trigger only in a place authenticated by the user, thereby improving security.

Figure 7:
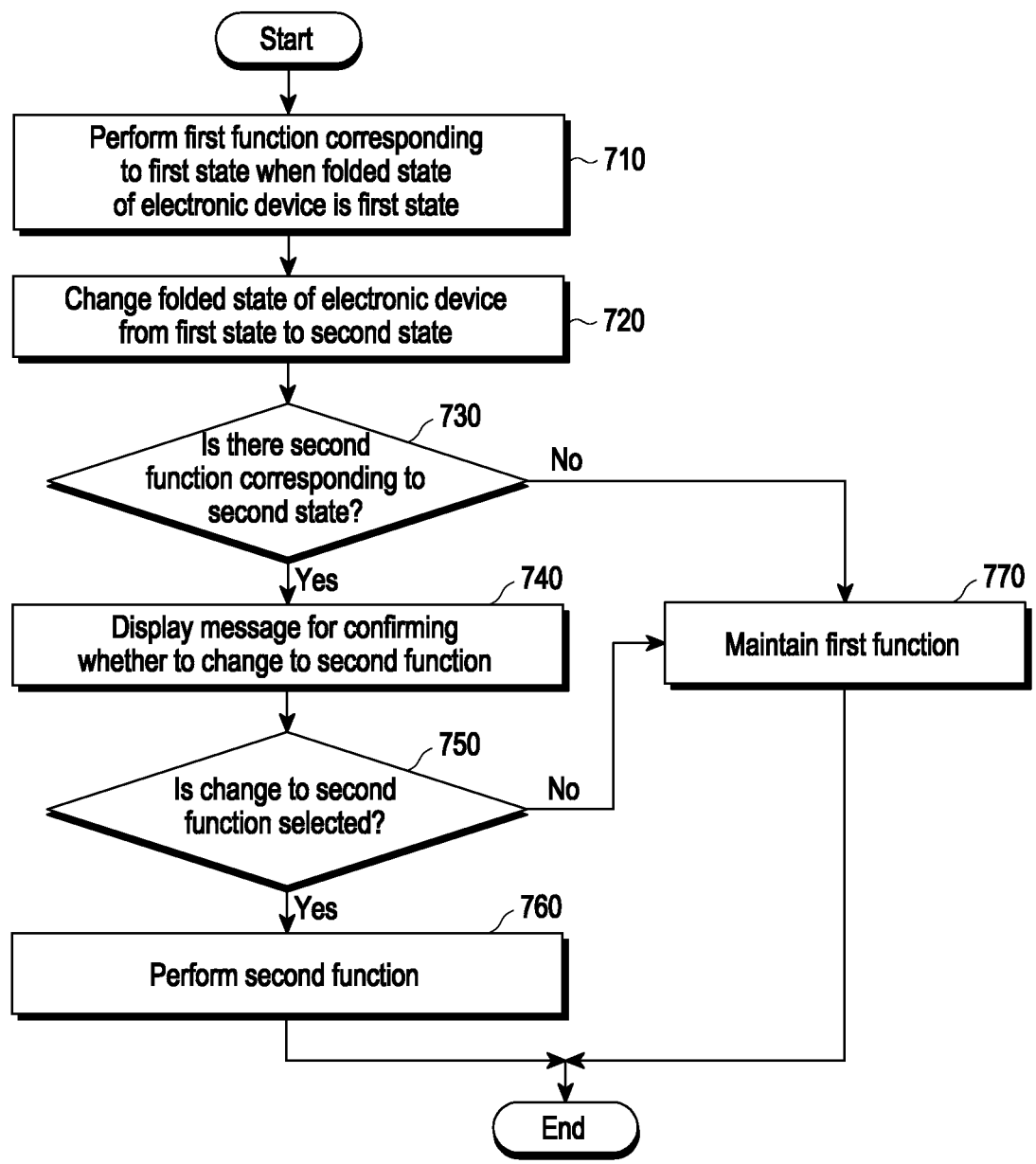
FIG. 7 is a diagram illustrating an operation of an electronic device according to a change in a folded state of the electronic device according to one embodiment.

According to various embodiments, when the folded state of the electronic device 101 is changed within the authenticated space as shown in FIG. 7, the processor (e.g., the processor 120) of the electronic device 101 may perform a function corresponding to the changed folded state.

According to various embodiments, in operation 710, when the folded state of the electronic device 101 is a first state, the processor (e.g., the processor 120) of the electronic device 101 may perform a first function corresponding to the first state. For example, when the electronic device 101 is placed within a prestored first area and the folded state of the electronic device 101 is a prestored first state, the processor (e.g., the processor 120) of the electronic device 101 may perform a prestored first function.

Figure 11:
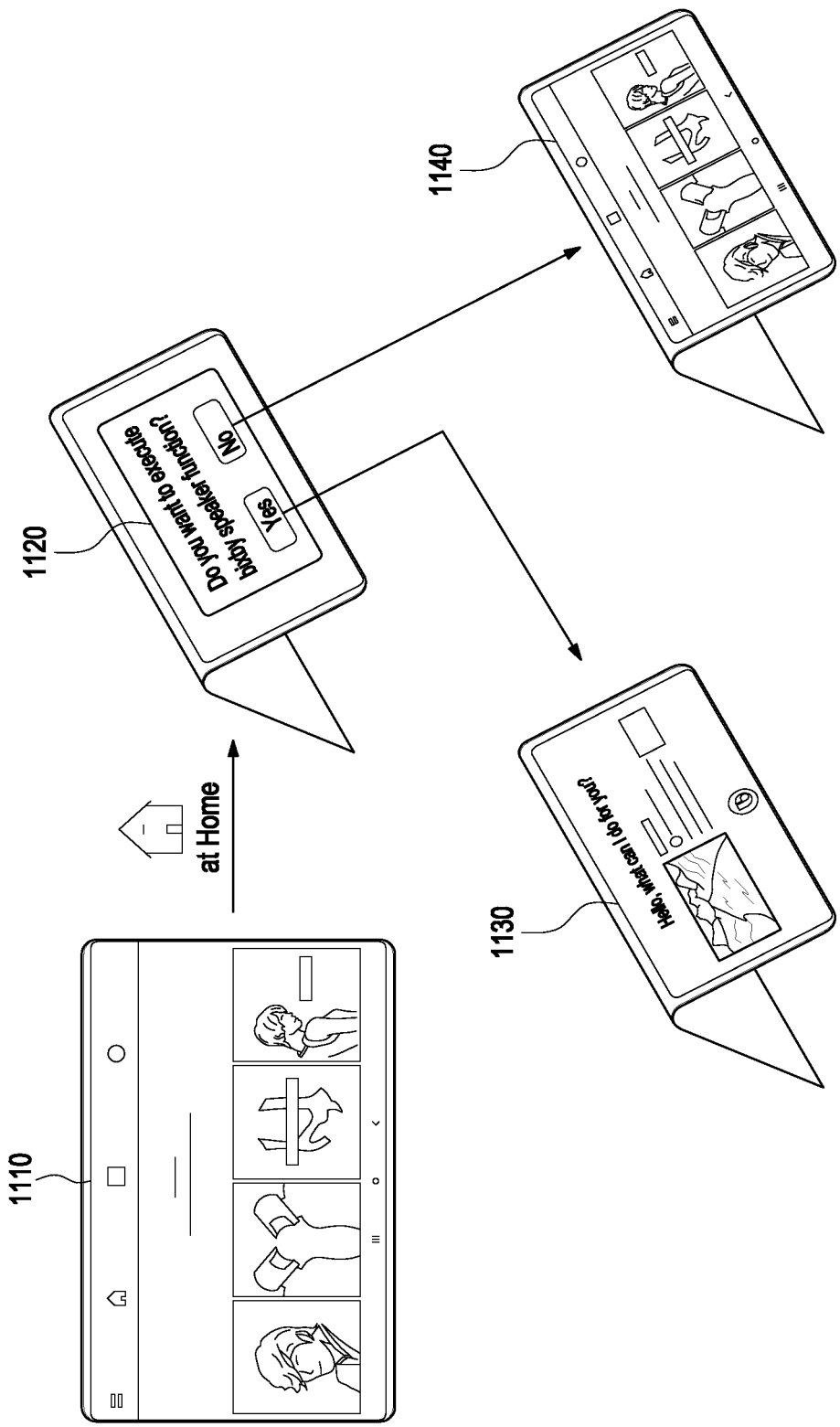
FIG. 11 is a diagram illustrating an operation of an electronic device according to a change in a folded state of the electronic device in a prestored location according to one embodiment.

For example, as shown in FIG. 11, when the electronic device 101 is located in a first area (e.g., home) that is an authenticated space and the folded state of the electronic device 101 is a first state (e.g., fully unfolded state), the processor (e.g., the processor 120) of the electronic device 101 may display the first area and a prestored function (e.g., game application) corresponding to the first state on an execution screen 1110.

According to various embodiments, in operation 720, the folded state of the electronic device 101 may be changed from the first state to the second state. For example, when the folded state of the electronic device 101 is changed from the first state to the second state according to the user's operation, the processor (e.g., the processor 120) of the electronic device 101 may identify that the folded state of the electronic device 101 is changed from the first state to the second state based on a value sensed through at least one sensor.

According to various embodiments, in operation 730, the processor (e.g., the processor 120) of the electronic device 101 may determine whether there is a second function corresponding to the second state. For example, the processor (e.g., the processor 120) of the electronic device 101 may determine whether the first area and the second function corresponding to the second state are prestored.

According to various embodiments, when there is the second function corresponding to the second state (operation 730—YES), in operation 740, the processor (e.g., the processor 120) of the electronic device 101 may display a message for determining whether to change the current function to the second function.

For example, as shown in FIG. 11, when the folded state of the electronic device 101 is changed from a first state (e.g., fully unfolded state) to a second state (e.g., standing state), the processor (e.g., the processor 120) of the electronic device 101 may identify whether there is a prestored second function (e.g., artificial intelligence speaker function) corresponding to the second state, and may display a message 1120 for determining whether to change the current function to the second function when the second function is prestored. According to various embodiments, at least a portion of a display (e.g., the display device 160) may be activated according to the folded state of the electronic device 101.

According to various embodiments, when changing to the second function is selected (operation 750—YES), in operation 760, the processor (e.g., the processor 120) of the electronic device 101 may perform the second function. For example, after the message for determining whether to change to the second function is displayed, when an operation command for changing the current function to the second function is input by the user, the processor (e.g., the processor 120) of the electronic device 101 may terminate the currently performed first function and may perform the second function.

For example, as shown in FIG. 11, when a command for changing to the second function is input through the message 1120 for determining whether to change to the second function, the processor (e.g., the processor 120) of the electronic device 101 may display an execution screen of the second function (e.g., an execution screen 1130 of the artificial intelligence speaker function) on at least an activated portion of the display (e.g., the display device 160).

According to various embodiments, when changing to the second function is selected (operation 750—NO), in operation 770, the processor (e.g., the processor 120) of the electronic device 101 may maintain the currently performed first function.

For example, as shown in FIG. 11, when a command for not changing to the second function is input through the message 1120 for determining whether to change to the second function, the processor (e.g., the processor 120) of the electronic device 101 may display an execution screen of the first function (e.g., a game application execution screen 1140) on at least an activated portion of the display (e.g., the display device 160).

According to various embodiments, when there is no second function corresponding to the second state (operation 730—NO), in operation 770, the processor (e.g., the processor 120) of the electronic device 101 may maintain the currently performed first function.

According to various embodiments, in FIG. 7, although it has been described that whether to perform the second function is determined by the user when the second function corresponding to the changed folded state of the electronic device is prestored, and the corresponding function is performed according to the determination result, when the second function corresponding to the changed folded state is stored, the second function may be implemented to be directly performed without user identification and whether to display the identification message may be configured by the user.

Figure 8:
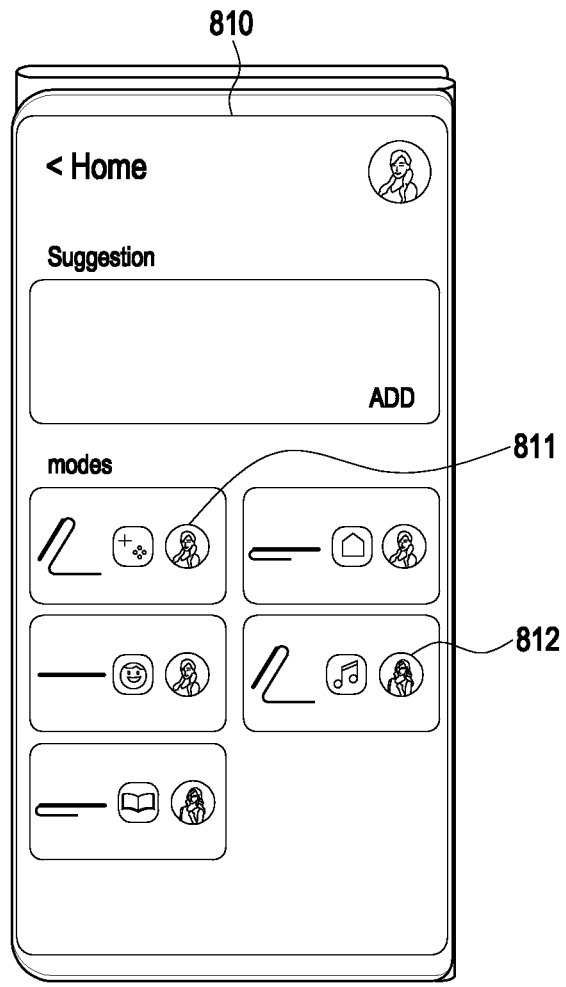
FIG. 8 is a diagram illustrating various embodiments of a function matching a location, a folded state, and an account of an electronic device according to one embodiment.

According to various embodiments, even user account information may be stored by matching the function as well as the location of the electronic device and the folded state of the electronic device. For example, as shown in FIG. 8, when the user selects home among the selected authenticated spaces, the processor (e.g., the processor 120) of the electronic device 101 may display a user interface screen 810 associated with the selected authenticated space, and the user may store even the user account information as well as the folded state of the electronic device 101 by matching the function through the user interface screen 810 associated with the authenticated space.

According to various embodiments, according to the user setting through the user interface screen 810 associated with the authentication space, a first user account 811 of the main user and a second user account 812 of another user may match the folded state of the electronic device in the standing state, respectively, and a different function may match for each user account. For example, in a case in which the electronic device 101 is located at a home and the folded state of the electronic device is the standing state, the processor (e.g., the processor 120) of the electronic device 101, when the authenticated user account is the first user account 811, a game application may be executed, and when the authenticated user account is the second user account 812, a music playback application may be executed. Meanwhile, although it has been illustrated and described in FIG. 8 that the second user account 812 is the account of the second user different from the first user, according to various embodiments, the second user account 812 may be the second account of the first user.

Figure 9:
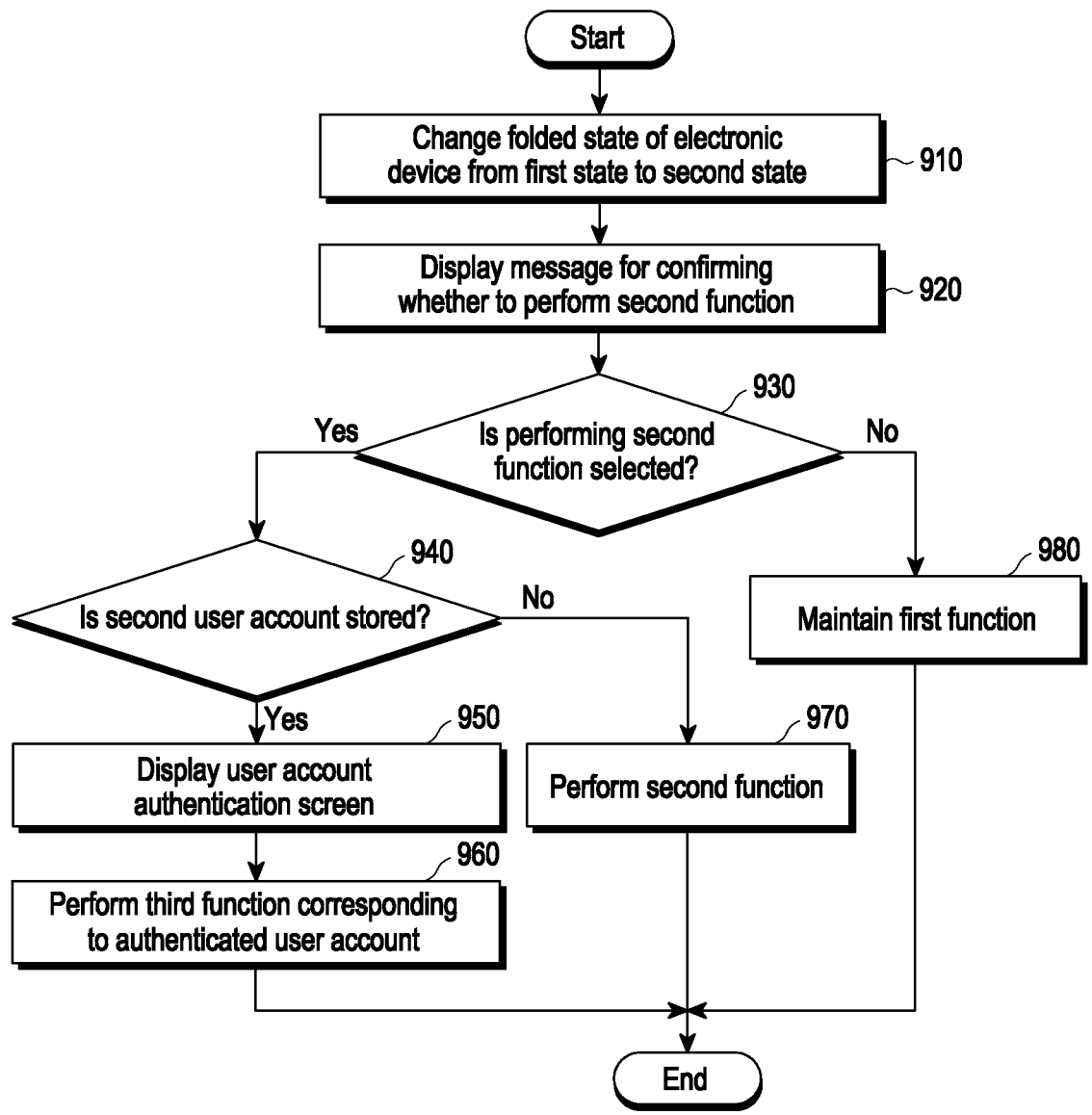
FIG. 9 is a diagram illustrating an operation of an electronic device according to a change in a folded state of the electronic device when a second user account is stored in the electronic device according to one embodiment.

FIG. 9 is a diagram illustrating an operation of an electronic device according to a change in a folded state of the electronic device when a second user account is stored in the electronic device according to one embodiment. For example, the second user account may be the second account of the main user of the electronic device 101 or an account of a user other than the main user.

According to various embodiments, in operation 910, the folded state of the electronic device 101 may be changed from a first state to a second state. According to one embodiment, the electronic device 101 may be located within a first area that is an authenticated space in which a corresponding function can be performed by utilizing the folded state as a trigger.

According to various embodiments, when a first function corresponding to the first state is prestored while the folded state of the electronic device 101 is the first state, the folded state of the electronic device 101 may be changed to the second state while the first function is being performed, and when the function corresponding to the first state is not stored, the folded state of the electronic device 101 may be changed from the first state to the second state while the function is not performed (e.g., displaying a home screen or a lock screen) or a function corresponding to an operation command of the user is being performed.

According to various embodiments, in operation 920, the processor (e.g., the processor 120) of the electronic device 101 may display a message for identifying whether to change to a second function. For example, when there is the second function corresponding to the second state, the processor (e.g., the processor 120) of the electronic device 101 may display the message for identifying whether to change to the second function. According to one embodiment, the second function may match a first user account that is the main user.

According to various embodiments, when there is no second function corresponding to the second state, the processor (e.g., the processor 120) of the electronic device 101 may maintain the function performed in the first state without displaying the message for changing to the second function even when the folded state of the electronic device 101 is changed from the first state to the second state. For example, when the second function corresponding to the second state is not prestored even though the folded state of the electronic device 101 is changed to the second state, the processor (e.g., the processor 120) of the electronic device 101 may maintain the function being performed in the first state, or may not perform the corresponding function even in the second state when the corresponding function is not performed in the first state.

According to various embodiments, when performing the second function is selected after displaying the message (e.g., operation 930—YES), in operation 940, the processor (e.g., the processor 120) of the electronic device 101 may determine whether a second user account is stored. For example, when the second account of the main user or a second user account that is the account of another user match the first area and the second state, and is stored (operation 940—YES), in operation 950, the processor (e.g., the processor 120) of the electronic device 101 may display a user account authentication screen. For example, the processor (e.g., the processor 120) of the electronic device 101 may display a user account authentication screen requesting an input of at least one of voice, iris, fingerprint, an ID, or a password.

According to various embodiments, a function in which the first user account matches the first area and the second state may be prestored or may not be prestored.

According to various embodiments, in operation 960, a third function corresponding to a user account authenticated through the user account authentication screen may be performed. For example, when there is a prestored function corresponding to the user account authenticated through the user account authentication screen, the processor (e.g., the processor 120) of the electronic device 101 may perform the prestored function, and may display a screen informing an authentication failure when there is no prestored function corresponding to an input user account.

According to various embodiments, when the second user account does not match the first area and the second state and is not stored (operation 940—NO), in operation 970, the processor (e.g., the processor 120) of the electronic device 101 may perform the second function. According to one embodiment, the second function may match the first user account that is the main user.

According to various embodiments, when not changing to the second function is selected (operation 930—NO), in operation 980, the processor (e.g., the processor 120) of the electronic device 101 may maintain the first function being performed in the first state. According to various embodiments, when the corresponding function is not performed in the first state, the processor (e.g., the processor 120) of the electronic device 101 may perform a function corresponding to a user operation command without performing the corresponding function even in the second state.

According to various embodiments, it has been illustrated and described in FIG. 9 that whether to perform the second function is determined by the user in operation 930 when the second function corresponding to the changed folded state of the electronic device is prestored and whether the second user account is stored is determined according to the determination result, but the processor (e.g., the processor 120) of the electronic device 101 may be implemented to determine whether the second user account corresponding to the first area and the second state is stored when the folded state of the electronic device 101 is changed to the second state, and whether to display a message for identifying the second function may be configured by the user.

Figure 12:
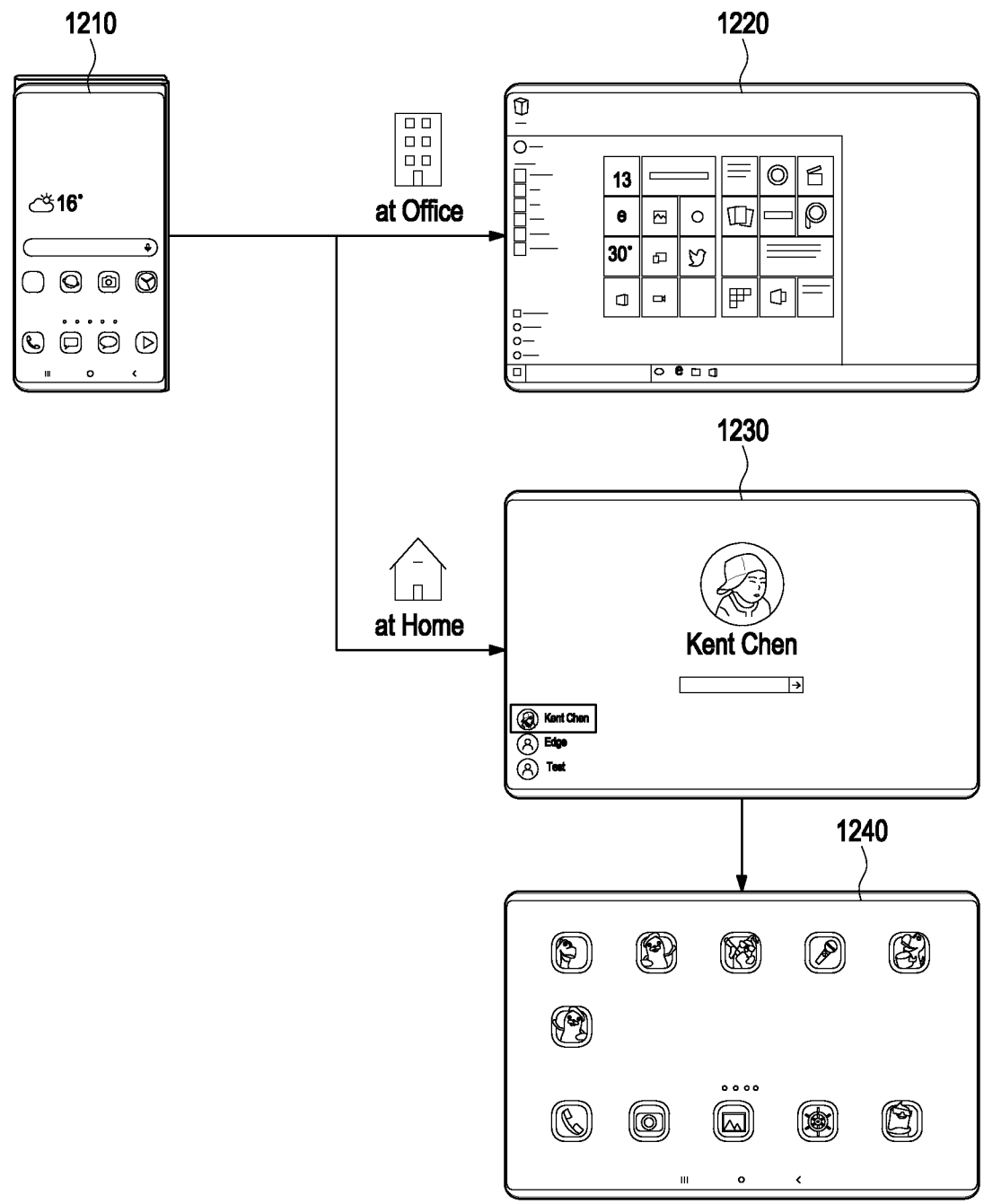
FIG. 12 is a diagram illustrating an operation of an electronic device according to a change in a folded state of the electronic device in a prestored location according to one embodiment.

For example, as shown in FIG. 12, when the folded state of the electronic device 101 is a fully folded state, the processor (e.g., the processor 120) of the electronic device 101 may display a screen 1210 of a smartphone operating system (e.g., Android™) stored at the time of manufacture of the electronic device 101.

According to various embodiments, when the folded state of the electronic device 101 is a fully folded state within a prestored first area (e.g., office), the processor (e.g., the processor 120) of the electronic device may display a screen 1220 of another operating system (e.g., Windows™) which is a function that matches the first area and the state of the fully unfolded electronic device 101 and is prestored. For example, the function of displaying the screen of the other operating system (e.g., Windows™) may match the first area and the state of the fully unfolded electronic device 101 and may be stored by the user's setting.

According to various embodiments, when the location of the electronic device 101 is located in a prestored second area (e.g., home) and the electronic device 101 is fully unfolded, the processor (e.g., the processor 120) of the electronic device 101 may perform a function that matches the second area and the state of the fully unfolded electronic device 101 and is prestored.

According to various embodiments, when a second user account corresponding to the second area and the state of the fully unfolded electronic device 101 is prestored, the processor (e.g., the processor 120) of the electronic device 101 may display a user account authentication screen 1230. According to various embodiments, even when the second user account corresponding to the second area and the folded state is not stored, the processor (e.g., the processor 120) of the electronic device 101 may display the user account authentication screen according to the user's setting.

According to various embodiments, when the user account is authenticated through the user account authentication screen 1230, the processor (e.g., the processor 120) of the electronic device 101 may display a screen 1240 on which the function corresponding to the authenticated user account has been performed. For example, when the authenticated user account is a child's account, the processor (e.g., the processor 120) of the electronic device 101 may display a screen of an operating system (e.g., kid mode) corresponding to the child's account.

Figure 13:
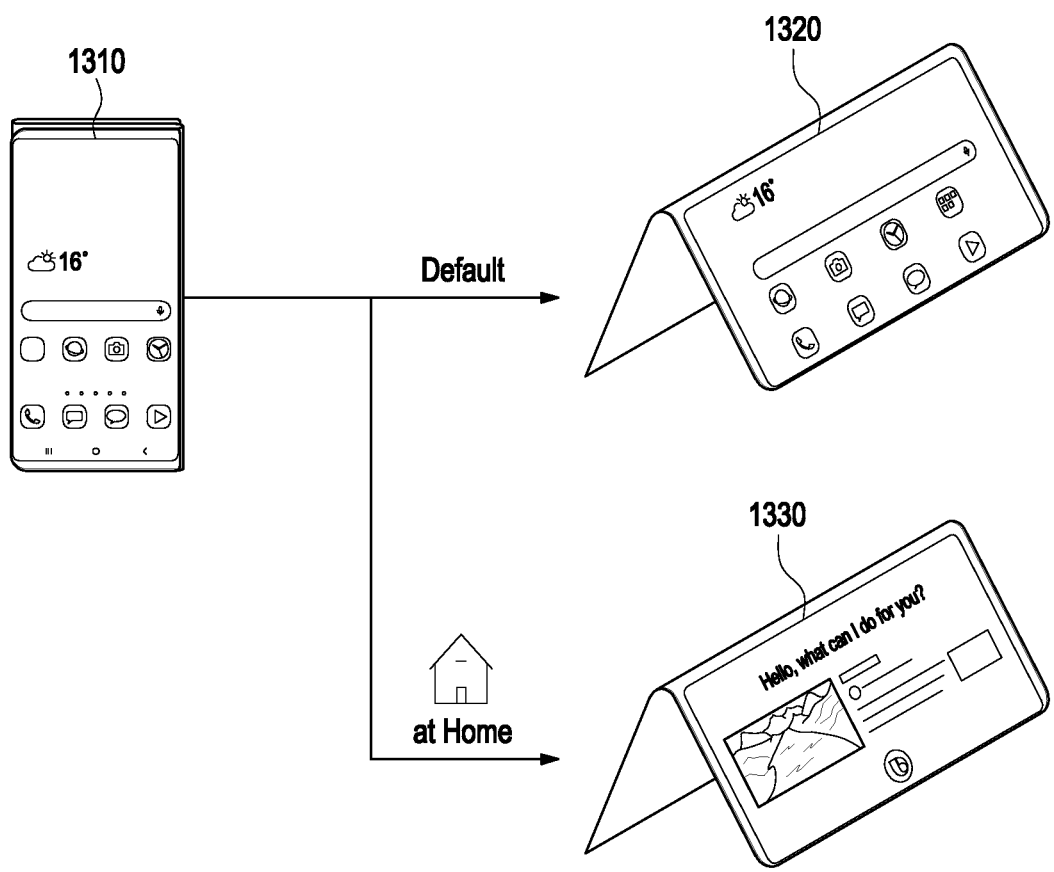
FIG. 13 is a diagram illustrating an operation of an electronic device according to a changed in a folded state of the electronic device in a prestored location according to one embodiment.

According to various embodiments, as shown in FIG. 13, when the folded state of the electronic device 101 is a fully folded state, the processor (e.g., the processor 120) of the electronic device may display a screen 1310 of a smartphone operating system (e.g., Android™) stored at the time of manufacture of the electronic device 101.

According to various embodiments, when the location of the electronic device 101 is outside the prestored first area (default) and the folded state of the electronic device 101 is a standing state, the processor (e.g., the processor 120) of the electronic device may display a screen 1320 obtained by changing the screen of the smartphone operating system to conform to the activated portion of the display (e.g., the display device 160) in the standing state.

According to various embodiments, when the location of the electronic device 101 is within the prestored first area (e.g., home) and the folded state of the electronic device 101 becomes the standing state, the processor (e.g., the processor 120) of the electronic device may display an execution screen 1330 of a function (e.g., artificial intelligence speaker function) that matches the first area and the folded state of the electronic device 101 being in the standing state and is prestored, on the activated portion of the display (e.g., the display device 160) in the standing state.

According to various embodiments, when an account of a second user corresponding to the first area and the folded state of the electronic device 101 being in the standing state is stored, the processor (e.g., the processor 120) of the electronic device may display a user account authentication screen. For example, when the account of the second user corresponding to the first area and the folded state of the electronic device 101 being in the standing state are stored, the processor (e.g., the processor 120) of the electronic device may display the execution screen 1330 of the artificial intelligence speaker function, may identify, when a user's voice is input after the screen is displayed, a user account corresponding to the user's voice, and may execute a prestored function corresponding to the identified user account.

As described above, by storing a plurality of pieces of user account information, the electronic device 101 can be used as a public device that can be customized for each of the plurality of users in an authenticated space.

An electronic device according to various embodiments may include a first housing and a second housing, a hinge configured to rotatably connect the first housing and the second housing, a display configured to be exposed through a first portion of the first housing and a second portion of the second housing, a location sensor, at least one sensor other than the location sensor, a memory, and a processor configured to be operatively connected to the display, the location sensor, the at least one sensor, and the memory, wherein the processor may be configured to identify a location of the electronic device through the location sensor, to identify a folded state of the electronic device through the at least one sensor, and to perform a prestored function corresponding to the location of the electronic device and the folded state of the electronic device.

According to various embodiments, when the location of the electronic device is within a prestored first area and the folded state of the electronic device is a first state, the processor may be configured to perform a first function corresponding to the first area and the first state, when the location of the electronic device is within the first area and the folded state of the electronic device is changed from the first state to a second state, the processor may be configured to determine whether there is a prestored second function corresponding to the first area and the second state, and when the second function is prestored, the processor may be configured to display a message for identifying whether to change the first function to the second function on at least a portion of the display.

According to various embodiments, when another user account corresponding to the first area and the second state is stored, the processor may be configured to display a user account authentication screen corresponding to the second function on at least a portion of the display, and may perform a third function corresponding to a user account authenticated through the user account authentication screen.

According to various embodiments, the folded state may be identified based on at least one of information indicating whether the first portion and the second portion are folded, an angle between the first portion and the second portion with respect to the hinge, an orientation of the electronic device, and an activated portion of the display.

According to various embodiments, the hinge may be a first hinge, and the electronic device may further include a third housing, and a second hinge configured to rotatably connect a third housing and the second housing, wherein the display may be exposed through the first portion of the first housing, the second portion of the second housing, and a third portion of the third housing, and the folded state may be identified based on at least one of information indicating whether the first portion and the second portion are folded, information indicating whether the second portion and the third portion are folded, an angle between the first portion and the second portion with respect to the first hinge, an angle between the second portion and the third portion with respect to the second hinge, an orientation of the electronic device, and an activated portion of the display.

According to various embodiments, the prestored function may be stored by matching the location of the electronic device and the folded state of the electronic device by a user's setting.

According to various embodiments, the prestored function may include executing an application matching the location of the electronic device and the folded state of the electronic device by the user's setting, changing a shape or size of an object displayed on a screen, or switching to another operating system in which a plurality of applications are installed.

According to various embodiments, the location sensor may include a GPS sensor, and the processor may be configured to determine whether the location of the electronic device is within the prestored first area through location information obtained through the GPS sensor and information indicating whether communication with a peripheral device is connected.

According to various embodiments, when the location of the electronic device is in an area other than at least one prestored area, the processor may be configured to perform a function based on an operation command of the user.

A method for controlling an electronic device including a first housing and a second housing, a hinge configured to rotatably connect the first housing and the second housing, a display configured to be exposed through a first portion of the first housing and a second portion of the second housing, a location sensor, and at least one sensor other than the location sensor may include identifying a location of the electronic device through the location sensor, identifying a folded state of the electronic device through the at least one sensor, and performing a prestored function corresponding to the location of the electronic device and the folded state of the electronic device.

According to various embodiments, the performing of the prestored function may further include performing, when the location of the electronic device is within a prestored first area and the folded state of the electronic device is a first state, a first function corresponding to the first area and the first state, determining whether there is a prestored second function corresponding to the first area and a second state when the location of the electronic device is within the first area and the folded state of the electronic device is changed from the first state to the second state, and displaying a message for identifying whether to change the first function to the second function on at least a portion of the display when the second function is prestored.

According to various embodiments, the displaying may further include displaying, when another user account corresponding to the first area and the second state is stored, a user account authentication screen corresponding to the second function on at least a portion of the display, and performing a third function corresponding to a user account authenticated through the user account authentication screen.

According to various embodiments, the identifying of the folded state may be based on at least one of information indicating whether the first portion and the second portion are folded, an angle between the first portion and the second portion with respect to the hinge, an orientation of the electronic device, and an activated portion of the display.

According to various embodiments, the hinge may be a first hinge, and the electronic device may further include a third housing and a second hinge for rotatably connecting a third housing and the second housing, the display may be exposed through the first portion of the first housing, the second portion of the second housing, and a third portion of the third housing, and the identifying of the folded state may be based on at least one of information indicating whether the first portion and the second portion are folded, information indicating whether the second portion and the third portion are folded, an angle between the first portion and the second portion with respect to the first hinge, an angle between the second portion and the third portion with respect to the second hinge, an orientation of the electronic device, and an activated portion of the display.

According to various embodiments, the prestored function may be stored by matching the location of the electronic device and the folded state of the electronic device by a user's setting.

According to various embodiments, the prestored function may include executing an application matching the location of the electronic device and the folded state of the electronic device by the user's setting, changing a shape or size of an object displayed on a screen, or switching to another operating system in which a plurality of applications are installed.

According to various embodiments, the method may further include determining whether the location of the electronic device is within the prestored first area through location information obtained through a GPS sensor of the electronic device and information indicating whether communication with a peripheral device is connected.

According to various embodiments, the method may further include performing, when the location of the electronic device is in an area other than at least one prestored area, a function based on an operation command of the user.

The electronic device 101 according to an embodiment of the disclosure may be one of various types of electronic devices. The electronic devices may include, for example, a portable communication device (e.g., a smartphone, a tablet PC, e-book, etc.), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first housing and a second housing;
a hinge configured to rotatably connect the first housing and the second housing;
a display configured to be exposed through a first portion of the first housing and a second portion of the second housing;
a location sensor;
at least one sensor;
a memory; and
a processor configured to be operatively connected to the display, the location sensor, the at least one sensor, and the memory,
wherein the processor is configured to
identify a location of the electronic device through the location sensor and identify a folded state of the electronic device through the at least one sensor,
perform, based on the location of the electronic device being within a first area and the folded state of the electronic device being a first state, a first prestored function corresponding to the first area and the first state, and perform, based on a determination that the location of the electronic device is within the first area and the folded state of the electronic device being a second state, a second prestored function corresponding to the first area and the second state.

2. The electronic device of claim 1, wherein the processor is further configured to display, a message for identifying whether to change the first prestored function to the second prestored function on at least a portion of the display.

3. The electronic device of claim 2, wherein the processor is configured to, based on a determination that another user account corresponds to the first area and the second state being stored, display a user account authentication screen corresponding to the second prestored function on at least a portion of the display, and perform a third function corresponding to a user account authenticated through the user account authentication screen.

4. The electronic device of claim 1, wherein the folded state is identified based on at least one of information indicating whether the first portion and the second portion are folded, an angle between the first portion and the second portion with respect to the hinge, an orientation of the electronic device, and an activated portion of the display.

5. The electronic device of claim 1, wherein the hinge is a first hinge and the electronic device further comprises:
  a third housing; and
  a second hinge configured to rotatably connect a third housing and the second housing,
  wherein the display is exposed through the first portion of the first housing, the second portion of the second housing, and a third portion of the third housing, and
  the folded state is identified based on at least one of information indicating whether the first portion and the second portion are folded, information indicating whether the second portion and the third portion are folded, an angle between the first portion and the second portion with respect to the first hinge, an angle between the second portion and the third portion with respect to the second hinge, an orientation of the electronic device, and an activated portion of the display.

6. The electronic device of claim 1, wherein the first prestored function is stored by matching the first area and the first folded state of the electronic device with a user's setting.

7. The electronic device of claim 6, wherein the first prestored function includes executing an application matching the first area and the first folded state of the electronic device with the user's setting, changing one or more of a shape and size of an object displayed on a screen, or switching to another operating system in which a plurality of applications is installed.

8. The electronic device of claim 1, wherein the location sensor includes a GPS sensor, and
  the processor is further configured to identify whether the is within the first area through location information obtained through the GPS sensor and information indicating whether communication with a peripheral device is connected.

9. The electronic device of claim 1, wherein, in response to the location of the electronic device being in an area other than at least one prestored area, the processor is configured to perform a function based on an operation command received from a user.

10. A method for controlling an electronic device including a first housing and a second housing, a hinge configured to rotatably connect the first housing and the second housing, a display configured to be exposed through a first portion of the first housing and a second portion of the second housing, a location sensor, and at least one sensor other than the location sensor, the method comprising:
  identifying a through the location sensor;
  identifying a folded state of the electronic device through the at least one sensor; and
  performing, based on the being within a first area and the folded state of the electronic device being a first state, a first prestored function corresponding to first area and the first state, and
  perform, based on a determination that the is within the first area and the folded state of the electronic device being a second state, a second prestored function corresponding to the first area and the second state.

11. The method of claim 10, wherein the performing of the first prestored function further includes
  displaying a message for identifying whether to change the first prestored function to the second prestored function on at least a portion of the display.

12. The method of claim 11, wherein the displaying further includes displaying, based on a determination that another user account corresponds to the first area and the second state being stored, a user account authentication screen corresponding to the second prestored function on at least a portion of the display, and
  performing a third function corresponding to a user account authenticated through the user account authentication screen.

13. The method of claim 10, wherein the identifying of the folded state is based on at least one of information indicating whether the first portion and the second portion are folded, an angle between the first portion and the second portion with respect to the hinge, an orientation of the electronic device, and an activated portion of the display.

14. The method of claim 10, wherein the hinge is a first hinge,
  the electronic device further includes a third housing and a second hinge for rotatably connecting a third housing and the second housing,
  the display is exposed through the first portion of the first housing, the second portion of the second housing, and a third portion of the third housing, and
  the identifying of the folded state is based on at least one of information indicating whether the first portion and the second portion are folded, information indicating whether the second portion and the third portion are folded, an angle between the first portion and the second portion with respect to the first hinge, an angle between the second portion and the third portion with respect to the second hinge, an orientation of the electronic device, and an activated portion of the display.

15. The method of claim 10, wherein the first prestored function is stored by matching the first area and the first folded state of the electronic device with a user's setting.

16. The method of claim 15, wherein the first prestored function includes executing an application matching the first area and the first folded state of the electronic device with the user's setting, changing one or more of a shape and size of an object displayed on a screen, or switching to another operating system in which a plurality of applications is installed.

17. The method of claim 10, further comprising:
identifying whether the is within the first area through location information obtained through a GPS sensor of the electronic device and information indicating whether communication with a peripheral device is connected.

18. The method of claim 10, further comprising:
in response to the being in an area other than at least one prestored area, performing a function based on an operation command received from a user.

* * * * *